INVENTOR
JOHANNES ENSINK,
JAN VERHAGEN,
HENDRIKUS CORNELIS VAN ROSSUM,
WILLEM BEIJNINK,
ARIE HERMANUS JURGENS
BY [signature]
AGENT INVENTOR
JOHANNES ENSINK
JAN VERHAGEN,
HENDRIKUS CORNELIS VAN ROSSUM
WILLEM BEIJNINK,
ARIE HERMANUS JURGENS
BY Fred M. Vogel
AGENT United States Patent Office 2,831,178

Patented Apr. 15, 1958

2,831,178

DEVICE FOR DISCRIMINATION AND RECEPTION OF CALL SIGNALS AND ALARM SIGNALS

Johannes Ensink, Jan Verhagen, Willem Beijnink, Hendrikus Cornelis van Rossum, and Arie Hermanus Jurgens, Hilversum, Netherlands, assignors, by mesne assignments, to North American Philips Company, Inc., New York, N. Y., a corporation of Delaware Application April 5, 1955, Serial No. 499,482

Claims priority, application Netherlands May 12, 1954

3 Claims. (Cl. 340—172)

This invention relates to devices in transmission systems suitable for the amplification and the reception of both calling signals, for example dialling pulses, and alarming signals, the same frequency being used for calling and for alarming, which devices actuate alarming means if the signals are below a minimum level and actuate calling means if a predetermined level of the signals is exceeded.

Such devices are used, for example, in carrier telephony transmission systems in which a plurality of audio-frequency channels are transmitted, each comprising an alarming pilot, the frequency of which corresponds to the frequency used for the calling signals. This has the advantage that only one oscillator is required at the transmitting end for producing the alarming frequency and the calling signal frequency, that during transmission difficulties with the frequency space above the audio-frequency band do not occur and that during reception one bandpass filter only is required for each channel to separate the alarming and calling channels from the audio-frequency band proper. The alarming pilot is in most cases permanently transmitted at a low level. If the level of the pilot decreases below a determined value, for example due to disturbance in the transmission path, it is necessary for alarming means to be actuated. Signalling is effected by providing for the output signal of the oscillator at the transmitting end to be of a pulsatory form. If the calling signals and the alarming signals have the same frequency, the level of the calling pulses occurring is naturally required to be higher than the maximum level of the alarming pilot.

The object of the invention is to provide a device comprising a minimum of amplifying elements to fulfil the said functions, whilst avoiding the use of sensitive and hence expensive relays, and it is characterized in that the device comprises an amplifying unit, the input and the output of which are coupled by means of a feedback circuit comprising selective means tuned to a frequency preferably considerably higher than the frequency of the signals and also comprising means which render the feedback either positive or negative under the control of a control voltage derived by rectification from the amplitude level of the said signals, the oscillation whose frequency is determined by the said selective means having derived from it a signal which actuates alarming means below a minimum level of the first-mentioned signals, the level of the first-mentioned signals having derived from it, likewise by rectification, a signal which is supplied to the input of the amplifying unit and which actuates the calling means included in the output circuit of the amplifying unit if a predetermined level of the first-mentioned signals is exceeded.

In order that the invention may be readily carried into effect, it will now be described, by way of example, with reference to the accompanying drawings, in which.

Figure 1:
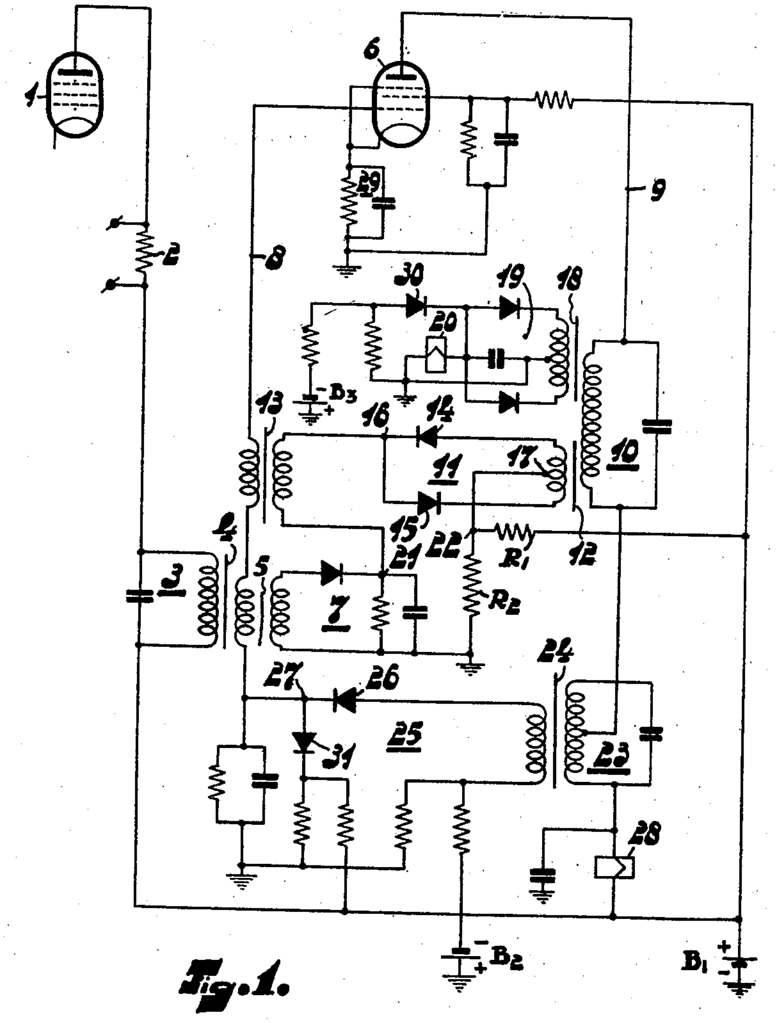
Figs. 1 and 2 show embodiments of the device according to the invention.

In Fig. 1, reference numeral 1 indicates a channel amplifying tube amplifying the whole frequency range of an audio-frequency channel, which thus comprises the audio-frequencies proper together with the calling and alarming frequencies. The amplified audio-frequency signal is derived via an impedance 2 included in the output circuit of tube 1. The output circuit also comprises a circuit 3 which is tuned to the frequency of the alarming and calling signals. The signals across circuit 3 are made active in both the input circuit 8 of an amplifying tube 6 and a rectifying circuit 7 with the use of inductive couplings 4 and 5. The input circuit 8 and the output circuit 9 of the amplifying tube are coupled by means of a feedback circuit comprising a tuned circuit 10, a switching element 11 and inductive couplings 12 and 13. The circuit 10 is preferably tuned to a frequency considerably higher than the frequency of the signals occurring across circuit 3.

The switching element 11 couples the circuit 10 by way of two connections to the input circuit 8 of tube 6, that is to say via a unilaterally conductive element 14 and via a unilaterally conductive element 15 respectively. The unilaterally conductive elements may be, for example, rectifying cells. Accordingly as the direct voltage of point 16 is positive or negative with respect to point 17, the coupling is effected via rectifying cell 15 or via rectifying cell 14. Point 17 constitutes a centre tap on the secondary winding of the inductive coupling 12, so that oscillations originating from coupling 12, when reaching via rectifier 14 the primary winding of inductive coupling 13 are shifted in phase by 180° with respect to the oscillations reaching the said primary winding via rectifying cell 15. This implies that the feedback coupling is positive in one case and negative in the other case.

If the feedback coupling is positive, the circuit above described thus fulfills the function of an oscillatory circuit and produces an oscillation, the frequency of which is determined by the circuit 10. Assuming the feedback coupling via the cell 15 to be positive and via the cell 14 to be negative, an oscillation of the said frequency occurs across circuit 10, if the direct voltage at point 16 is positive with respect to that at point 17. By means of an inductive coupling 18, said oscillation is made active in an alarm relay circuit 19 comprising a relay 20. The relay is energized in the presence of oscillations and de-energized in the absence thereof.

The direct voltage at the points 16 and 17 arises as a result of the difference between the direct voltages at the points 21 and 22. The direct voltage at point 22 is determined by the voltage division in the circuit comprising a battery $B_1$, resistors $R_1$ and $R_2$ and earth. The direct voltage at point 21 results from the oscillation across circuit 23 by rectification with the use of rectifying circuit 7. Said direct voltage is thus dependent upon the level of the oscillation across circuit 3 and hence upon the level of the alarming signal and the calling signal. If this level is low, the direct voltage at point 21 is also low, and if this level is high, said direct voltage is also high. The direct voltage across point 22, which is constant, determines at what level of the oscillations across circuit 3 the direct voltage between the points 16 and 17 is positive or negative and hence at what level the feed-back coupling is positive or negative. Consequently, if the level of the oscillations occurring across circuit 3 decreases below the value determined by the direct voltage at point 22, the feed-back coupling in the example chosen is negative and the alarming relay 20 is de-energized. The circuit could naturally have been designed in such manner that when the level of the oscillations across circuit 3 decreases below the level determined by the direct voltage at point 22, the feed-back coupling passes from the negative condition into the positive condition, so that an oscillation is produced across circuit 10 which causes the circuit 19 to energize the relay 20.

It will be evident that the occurrence of calling signal pulses does not adversely affect the operation of the alarming portion above described, since the signal pulses cause only a temporary increase of the level of the oscillations across circuit 3, so that if the level of the alarming signal across circuit 3 is higher than the minimum level determined by the voltage at point 22, the alarming relay 20 is at the most energized more strongly during the occurrence of the signal pulses and if the said level is lower than the minimum level, the pilot relay passes from the energized condition into the de-energized condition, or conversely, only during the occurrence of the signal pulses.

As mentioned before, the signals occurring across circuit 3 are supplied not only to the rectifying circuit 7, but also to the input circuit 8 of the amplifying tube 6. Said signals which comprise the alarming signal and, as the case may be, the calling signal, are amplified by means of amplifier 6. The anode lead of tube 6 includes a circuit 23 which is tuned to the common frequency of the said signals. The signals occur in amplified form across the circuit 23. Circuit 23 is coupled by way of an inductive coupling 24 to a rectifying circuit 25 in which a direct voltage provided by a battery $B_2$ is also active. Said direct voltage has a value such that, if alarming signals only occur across circuit 3 and hence across circuit 23, the cell 26 remains cut off and point 27 thus is at earth potential. An RC-network 29 included in the cathode circuit of tube 6 is so proportioned that the resulting direct anode current in circuit 9 does not energize a relay 28 to a sufficient extent. The value of the direct voltage is furthermore such that in the presence of calling signals across circuit 3 and hence amplified calling signals across circuit 23, the cell 26 can become conducting and the point 27 thus is positive with respect to earth. This results in an increase in the grid-bias. As a result of the increase in grid-bias, the tube thus conveys a considerably higher anode current. The anode current occurring by the action of the pulses supplied to the grid can now energize relay 28, which in its turn actuates calling means in known manner.

The tube 6 thus performs several tasks in the device shown in Fig. 1. The tube operates as a part of an oscillator, as a part of an alternating-current amplifier and as a part of a direct-current amplifier. The oscillator-amplitude may thus not be limited by means of the tube. For this purpose use is made of a rectifying cell 30 in the circuit 19, which is biassed by means of a battery $B_3$. It will be evident that the tube 6 must not be driven completely by the direct voltage at point 27. A cell 31 included in the circuit 25 and biassed from the battery $B_1$ serves to limit the said direct voltage.

The advantage of the device according to the invention thus resides in the fact that one amplifying section only is present and that nevertheless the relays 20 and 28 need by no means be sensitive. As far as relay 20 is concerned, this is due to the fact that this relay does not respond immediately to the rectified alarming signals, which usually are weak, but responds to the rectified self-generated oscillation. The energy of this self-generated oscillation may fundamentally be chosen at will. As far as relay 28 is concerned, this relay is not energized immediately by the rectified calling signals, but is energized by calling signals in the anode circuit, which are also considerably stronger than the initial pulses supplied to the grid of the tube.

It is noted that the amplifying section, if desired, may comprise a plurality of tubes and, as an alternative, transistors or other amplifying elements.

Figure 2:
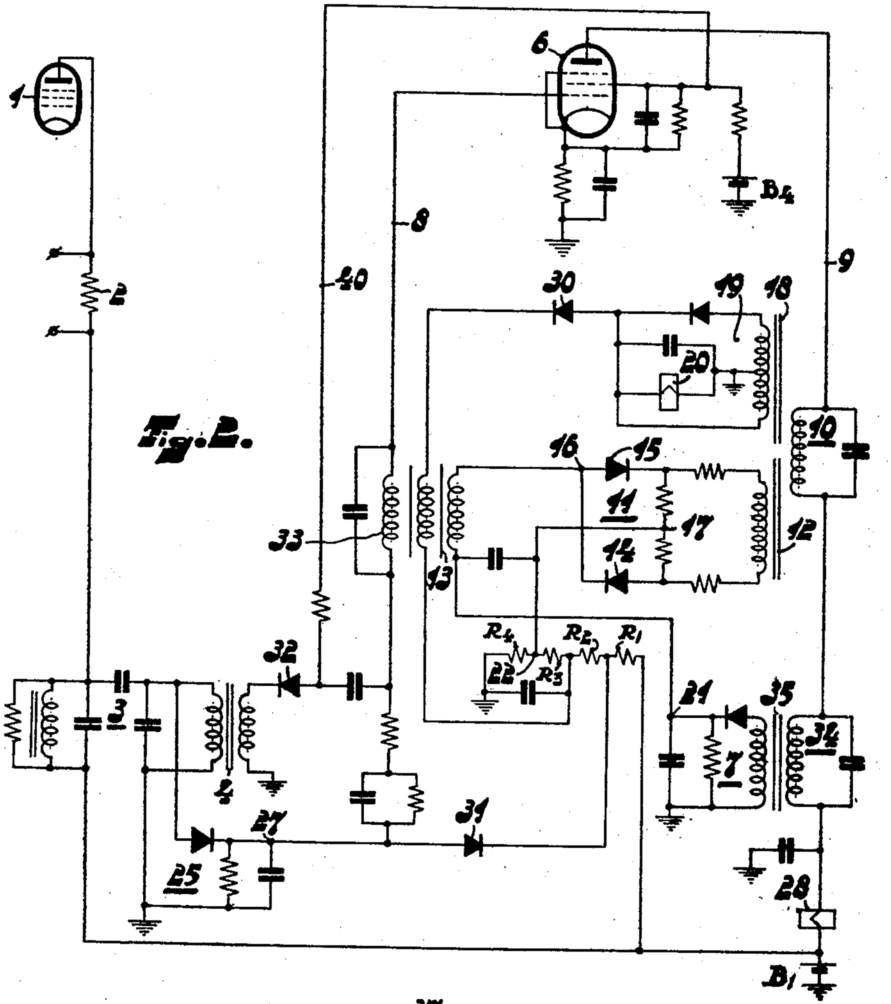

Fig. 2 shows another embodiment of a device according to the invention. Reference numeral 1 indicates, as before, the channel amplifying tube, 2 indicates the impedance from which the amplified audio-frequency signal is derived, and 3 indicates a circuit which is tuned to the frequency of the alarming and calling signals. The inductive coupling 4 makes the said signals active in the input circuit 8 of amplifying tube 6. The input circuit includes inter alia a unilaterally conductive element 32 which is biassed by a battery $B_4$ via a circuit 40. Said element is conducting at normal operating conditions. The cell 32 serves as a limiter only at unwanted high levels of the signals occurring across circuit 3 so as to avoid overload on the tube.

The input circuit 8 and the output circuit 9 of the amplifying tube are coupled, as before, by means of a feed-back circuit comprising the tuned circuit 10 and the switching element 11, the inductive couplings 12 and 13 and, in the case under consideration, also a tuned circuit 33. The circuits 10 and 33 have the same resonance frequency. In this case also said frequency is preferably considerably higher than the frequency of the signals occurring across circuit 3. The switching element 11, as before, couples the circuit 10 via two connections to the input circuit 8 of tube 6 via unilaterally conductive element 14 and via the unilaterally conductive element, 15 respectively. The feed-back coupling, as before, is either positive or negative according to the polarity of the voltage between the points 16 and 17. The oscillation produced across the circuit 10 and 33 in the case of positive feed-back is made active in the alarm relay circuit 19 including the relay 20 by way of the inductive coupling 18.

The voltage between the points 16 and 17 is, as before, dependent upon the voltage between the points 21 and 22. The direct voltage at point 22 is determined by the voltage division in the circuit comprising the battery $B_1$, the resistors $R_1$, $R_2$, $R_3$, $R_4$, and earth. The voltage at point 21 is produced in a somewhat different way as compared with the device of Fig. 1. The signal across circuit 3 is first supplied to the input circuit 8 of tube 6 and amplified with the use thereof. The amplified signal is derived via circuit 34, which is tuned to the common frequency of the alarming and calling signals, and supplied by way of an inductive coupling 35 to the rectifying circuit 7 which otherwise fulfills a function similar to that of rectifying circuit 7 of the device shown in Fig. 1.

The signals occurring across circuit 3 are also supplied to the rectifying circuit 25. In the presence of calling signals, the voltage at point 27 increases to such an extent that the resultant higher anode current can energize the relay 28. The rectifying cell 28 serves, as before, for limitation.

The oscillator portion is limited in a somewhat different way as compared with the device of Fig. 1. The cell 30 is biassed via the voltage division $R_1$, $R_2$, $R_3$, $R_4$. If the level of the oscillation produced across circuit 10 increases above permissible limits, the cell 30 becomes conducting. The cell 30 is inductively coupled to the feed-back circuit and if it is conducting, it constitutes a considerable load in the oscillatory circuit, causing it to be damped.

Figure 3:
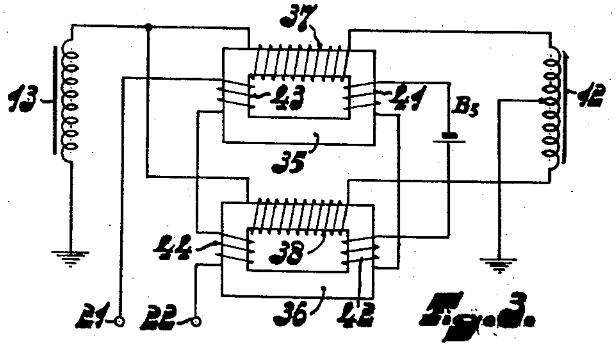
Fig. 3 shows a circuit element as may be used in the device according to the invention.

It will be evident that the switching element 11 need not necessarily be built up in the manner shown in Figs. 1 and 2. Thus, for example, instead of utilising particular non-linear elements, which in this case are unilaterally conductive, such as rectifying cells, in general use may be made of non-linear elements as shown in Fig. 3. The switching element comprises non-linear ferromagnetic cores 35 and 36 comprising windings 37 and 38 which are included in the circuit between the inductive couplings 12 and 13. Both cores 35 and 36 have been substantially brought into the state of saturation by means of biassing. The bias in the case of the switching element of Fig. 3 is made active by means of windings 41 and 42 provided on the cores and traversed by a direct current supplied by a direct-voltage source $B_5$. As an alternative, the bias may be made active by means of permanent magnets. The cores 35 and 36 also comprise windings 43 and 44 connected to terminals 21 and 22, which have applied to them a direct voltage similar to the voltage which occurs at the points 21 and 22 of the devices shown in Figs. 1 and 2. The winding sense of the windings 43 and 44 is such that if the direct current traversing the said windings has a determined direction, one core is brought farther into the state of saturation, whereas the other core is brought farther out of the state of saturation. However, if the direction of the direct current traversing the said windings is reversed, one core is brought farther out of the state of saturation and the other is brought farther into the state of saturation. The impedance constituted by a winding surrounding a core brought into the state of saturation is comparatively small with respect to the impedance constituted by this winding if the core is brought out of the state of saturation. Consequently, the connection between the inductive couplings 12 and 13 is established either via winding 37 of via winding 38 according to the polarity of the voltage between the points 21 and 22, so that similarly as with the switching elements of Figs. 1 and 2 the phase of the transmission in one case is shifted by $\pi$ radials with respect to the phase of the transmission in the other case and this becomes manifest in the device of which the switching element forms part in that in one case the feedback coupling is positive and in the other case the feedback coupling is negative. In Fig. 3 use is made of two separate cores 35 and 36. It will be evident that the separate cores may be united in known manner to form a single core comprising three limbs.

What is claimed is:

1. A circuit for selectively actuating a call signalling means and an alarm signalling means in response to a signal having a given frequency and having a first amplitude level for actuating the calling means and a second amplitude level for actuating the alarm means, said circuit comprising a single amplifier, means for feeding said signal to said amplifier, a feedback circuit connected between the input and output of said amplifier and comprising a frequency-selective circuit tuned to a frequency other than said given frequency, means responsive to a control voltage for selectively rendering positive or negative the feedback provided by said feedback circuit, a rectifier circuit connected to produce said control voltage by rectification of said signal whereby said feedback is negative when said signal has one of said amplitude levels and is positive when said signal has the other of said amplitude levels and whereby said amplifier oscillates at a frequency determined by said frequency-selective circuit when said feedback is positive, means connected to actuate one of said signalling means in response to said oscillation of the amplifier, means for supplying current to the output circuit of said amplifier, means responsive to the magnitude of said current for actuating the other of said signalling means, and rectifier means connected to receive said signal and connected to the input of said amplifier to cause the magnitude of said current to vary in response to the magnitude of said signal.

2. A circuit as claimed in claim 1, in which the last-named rectifier means is connected to receive said signal from the output of said amplifier.

3. A circuit as claimed in claim 1, in which said means for selectively rendering the feedback positive or negative comprises a pair of non-linear electrically conductive elements connected in parallel in said feedback circuit and means connected to selectively cause said non-linear elements to alternatively have a relatively lower impedance in response to said control voltage.

References Cited in the file of this patent

UNITED STATES PATENTS

| | | |
|---|---|---|
| 2,505,577 | Rich | Apr. 25, 1950 |
| 2,531,416 | Ferrar | Nov. 28, 1950 |
| 2,715,718 | Holtje | Aug. 16, 1955 |